United States Patent
Tyrer et al.

(10) Patent No.: US 7,100,641 B2
(45) Date of Patent: Sep. 5, 2006

(54) PROTECTIVE DUCTING

(75) Inventors: Andrew Charles Ratcliffe Tyrer, Merseyside (GB); Richard Hepworth, Lancashire (GB)

(73) Assignee: CRP Group Limited, Lancashire (GB)

( * ) Notice: Subject to any disclaimer, the term of this patent is extended or adjusted under 35 U.S.C. 154(b) by 0 days.

(21) Appl. No.: 10/514,328

(22) PCT Filed: Mar. 26, 2003

(86) PCT No.: PCT/GB03/01339

§ 371 (c)(1),
(2), (4) Date: Jun. 10, 2005

(87) PCT Pub. No.: WO03/098085

PCT Pub. Date: Nov. 27, 2003

(65) Prior Publication Data

US 2005/0247366 A1    Nov. 10, 2005

(30) Foreign Application Priority Data

May 15, 2002   (GB)  ................................. 0211140.9

(51) Int. Cl.
*F16L 9/22* (2006.01)
*H02G 3/04* (2006.01)

(52) U.S. Cl. ...................... 138/110; 138/161; 138/156; 138/157; 138/158; 138/162

(58) Field of Classification Search ........ 138/156–158, 138/161–163, 166–168, 110; 441/133, 134; 405/67
See application file for complete search history.

(56) References Cited

U.S. PATENT DOCUMENTS

| 2,628,134 | A | * | 2/1953 | Williams et al. | ......... | 175/325.7 |
| 2,936,786 | A |   | 5/1960 | Versoy et al. | ................ | 138/158 |
| 3,332,093 | A | * | 7/1967 | Skinner et al. | ............. | 441/133 |
| 5,197,912 | A | * | 3/1993 | Lengefeld | .................... | 441/133 |
| 5,330,378 | A | * | 7/1994 | Park | .......................... | 441/133 |
| 5,368,074 | A |   | 11/1994 | Hall | ........................ | 138/96 T |
| 5,819,805 | A |   | 10/1998 | Mosing et al. | ............ | 138/96 T |
| 6,270,387 | B1 | * | 8/2001 | Nesheim | ..................... | 441/133 |

FOREIGN PATENT DOCUMENTS

| GB | 1585058 |   | 6/1976 |
| GB | 2041482 | A  * | 9/1980 |
| GB | 2260590 |   | 4/1993 |

* cited by examiner

*Primary Examiner*—Patrick Brinson
(74) *Attorney, Agent, or Firm*—Clark & Brody

(57) ABSTRACT

There is described ducting comprising a plurality of interconnectible elongate ducting components (2, 4) which when assembled define an elongate, longitudinally extending internal channel (22) for receiving a pipe, cable or like elongate member, each ducting component having a shaped inner face (14) with a longitudinal recess (20) such that the components can be assembled with confronting inner faces (16, 18), their respective longitudinal recesses being thereby aligned to form the channel, the ducting further comprising tension bands (6) for securing assembled pairs of components to one another, wherein each ducting component is provided with a transversely extending internal cavity for receiving a tension band, the cavity having two open ends so that the band can pass through the internal cavity of one ducting component and though a corresponding internal cavity of an adjacent ducting component in order to secure one to the other, at least part of the band being thereby contained and protected within the cavities.

22 Claims, 3 Drawing Sheets

PROTECTIVE DUCTING

The present invention relates to protective ducting, and in particular, but not exclusively, to protective ducting for pipes, cables and like elongate members.

Once pipes or cables have been laid, it is desirable to protect them from physical damage. The marine environment is particularly demanding in this regard. In the oil industry, for example, pipes such as the risers used e.g. to draw hydrocarbons to the surface and to inject fluid into a well, can be subject to motion relative to the sea bed and require protection from resulting abrasion. Sea bed materials such as coral may otherwise destroy even armoured risers.

It is known to provide such pipes or cables with a tough, segmented exterior cladding. An example of such cladding is disclosed in the applicant's patent GB2260590 and comprises moulded plastics cladding components of generally semi-tubular shape which are assembled around the pipe or cable, each component having a shaped inner face which abuts the corresponding face of a diametrically opposed further component, the two shaped inner faces together defining a channel along the length of the ducting which receives the pipe or cable. Male and female mating features, such as nipples and corresponding blind holes, formed in confronting portions of the inner faces assist in correct alignment of the components relative to each other. To secure the ducting together a band is placed around an assembled pair of ducting components, tensioned and then secured. It is known to form a shallow circumferentially extending recess in the exterior of the ducting components to receive the band.

The tension bands are typically of metal and are tensioned and secured in a manner well known in itself utilising a crimped buckle arrangement. It is known to form a shallow recess or "pocket", in a region of the exterior of the cladding component remote from the join line where the component meets its diametrically opposed counterpart, in which the buckle sits. This facilitates the tensioning and crimping and provides some protection against damage to the buckle.

While cladding of this type has been highly successful, both technically and commercially, it is desirable (with a view to extending working life and minimising the likelihood of failure of the cladding) to maximise resistance of the cladding to physical damage in use.

In accordance with a first aspect of the present invention there is ducting comprising a plurality of interconnectible elongate ducting components which when assembled define an elongate, longitudinally extending internal channel for receiving a pipe, cable or like elongate member, each ducting component having a shaped inner face with a longitudinal recess such that the components can be assembled with confronting inner faces, their respective longitudinal recesses being thereby aligned to form the channel, the ducting further comprising tension bands for securing assembled pairs of components to one another, wherein each ducting component is provided with a transversely extending internal cavity for receiving a tension band, the cavity having two open ends so that the band can pass through the internal cavity of one ducting component and through a corresponding internal cavity of an adjacent ducting component in order to secure one to the other, at least part of the band being thereby contained and protected within the cavities.

In accordance with a second aspect of the present invention there is an elongate ducting component having a shaped inner face in which is formed a longitudinal recess, the inner face providing confronting surfaces on either side of the recess for confronting corresponding surfaces of a further ducting component thereby to form, with the further ducting component, an elongate, longitudinally extending internal channel for receipt of a pipe, cable or like elongate member, the ducting component having an end region which is shaped to overlap and engage with a further, longitudinally juxtaposed, ducting component, enabling formation of an elongate duct and having at least one transversely extending internal cavity for receiving a tension band, the cavity having two open ends so that the band can pass through the internal cavity of the component to secure it to a neighbouring component.

The invention permits even the tension bands to be largely or wholly protected by the ducting components. Problems of abrasion or snagging of the bands are thereby overcome.

Specific embodiments of the present invention will now be described, by way of example only, with reference to the accompanying drawings in which.

Figure 1:
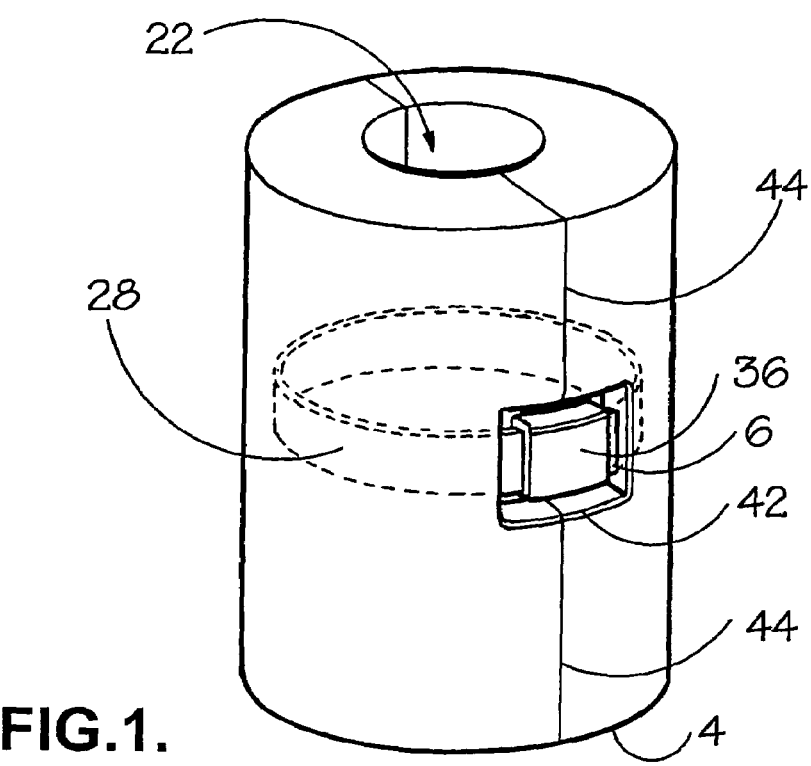
FIG. 1 illustrates in perspective a short length of ducting embodying the present invention in an assembled configuration.
Figure 2:
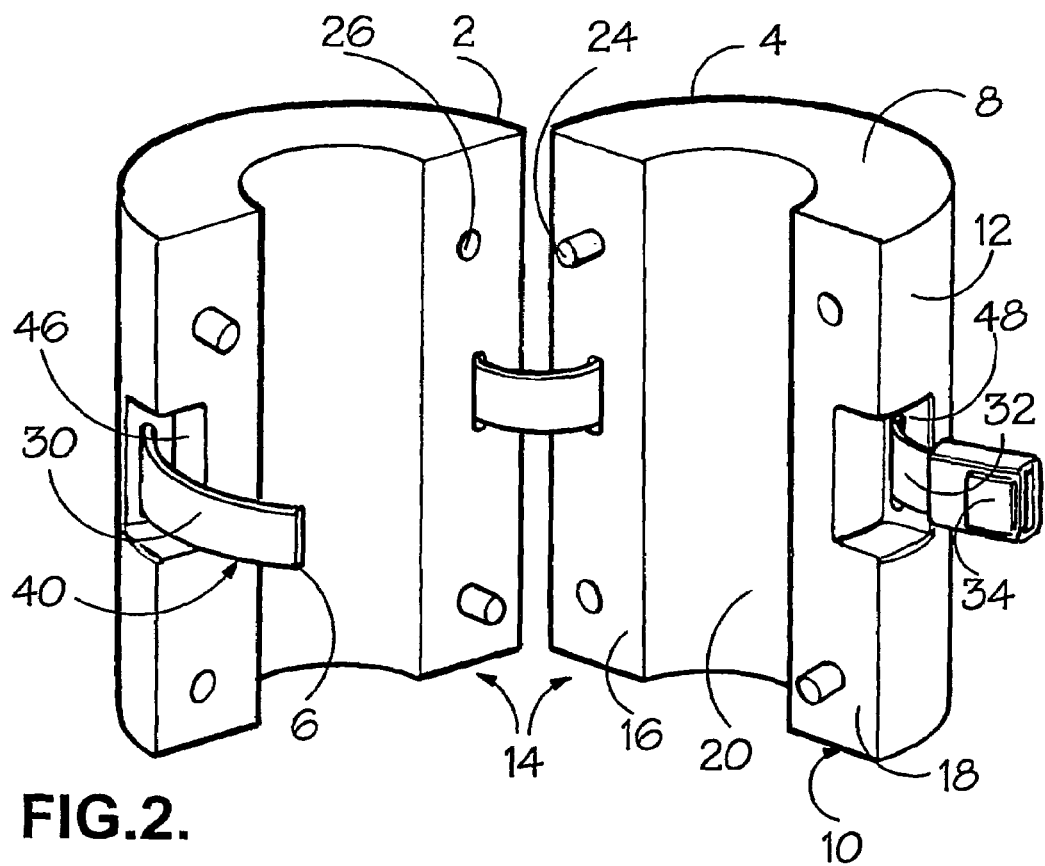
FIG. 2 illustrates in perspective the same short length of ducting when partly disassembled.

FIGS. 1 and 2 show short lengths of a pair of ducting components 2, 4, joined by means of a tension band 6. It must be understood that, for the sake of representational simplicity, only part of both ducting components 2, 4 is shown, the components being broken off at 8 and 10. It can nonetheless be seen that the ducting components of this particular embodiment are semi-tubular, forming a circular duct when assembled. Circular ducting is convenient to manufacture and advantageous in many applications. Nonetheless the present invention may be applied to non-circular ducting. For example, non-circular ducting may be used to contain bundled members such as cabling or tubing Each ducting component in the illustrated embodiment has a semi-circular surface 12 referred to as the "outer" surface since it forms the exterior of the assembled duct and an inner surface 14 which is concealed within the duct following assembly. The inner surface 14 is shaped to provide flat "confronting" portions 16, 18 and portions 20 of semi-circular cross section forming in the inner faces longitudinally extending recesses which align in the assembled ducting to form a longitudinal channel 22. In use the ducting components are assembled around a pipe, cable or like member which is received in the channel 22.

The ducting components 2, 4 are aligned relative to each other by virtue of registration features formed at the confronting portions 16, 18 of the respective inner faces 14. These are in the present embodiment of male and female type, more specifically comprising pips 24 received in complementary blind holes 26.

The tension band 6 serves to secure one ducting component 2 to the other 4. In marine ducting the band is chosen to be metal for its high tensile strength and the most preferred alloy is known by the reference UNSNO6625. Titanium may alternatively be used. In accordance with the present invention, the tension band 6 is disposed in cavities formed within the ducting components 2, 4. Hence in the assembled configuration of FIG. 1 the band is largely contained, and so protected, within the ducting components and is seen mainly in phantom. The cavities which receive the band extend transversely to the ducting. More specifically, since the illustrated embodiment comprises semi-annular cavities, they can be said to be diametrally extending. Each cavity is open at both of its ends and includes a surrounding cavity wall extending between the two open ends to freely allow the band 6 to pass therethrough. In each case one end opens through a confronting portion 16 of the inner face 14, so that in this area the band is not exposed to the exterior. The opposite end however opens towards the exterior of the ducting so that the band's two ends 30, 32 are accessible, following assembly of the two halves of the ducting, to allow the band to be tensioned and secured. In the illustrated embodiment known banding technology is utilised, one end of the band being bent backwards on itself as seen at 34 to retain a buckle 36 formed as a generally flat loop of metal sheet. To secure the band its free end 30 is passed through the buckle 36 and a known banding tool is then applied to draw the band to a selected tension, crimp edge regions of the band and buckle, preventing withdrawal of the band, and to snip off spare length of the band's free end protruding beyond the buckle.

Assembly of the ducting is a time sensitive process and to facilitate insertion of the tension band 28 to the cavities in the ducting components its free end 30 may be pre-formed to assume an appropriate curve as seen at 40. Furthermore the openings through which the band is inserted may have widened mouths, more easily to receive the band.

It can be seen in FIGS. 1 and 2 that the buckle 36 of the tension band sits in a shallow pocket 42 at the ducting's exterior. This pocket serves both to facilitate insertion of the band and to afford the buckle some degree of protection—being set down into the ducting, the buckle is less prone to being caught in surrounding objects (e.g. rocks on the sea bed) or to being abraded thereby than if it stood proud of the ducting surface. The illustrated embodiment is believed to be innovative in that the pocket 42 extends across a join line 44 of the ducting, being formed by aligned part-pockets 46, 48 in the respective ducting components 2, 4. Hence the buckle can be placed across the join line.

In an alternative construction (not illustrated) the full pocket is formed on one side of the join line between diametrally adjacent ducting components, the band exiting an opening facing into the pocket on the adjacent component.

Figure 3:
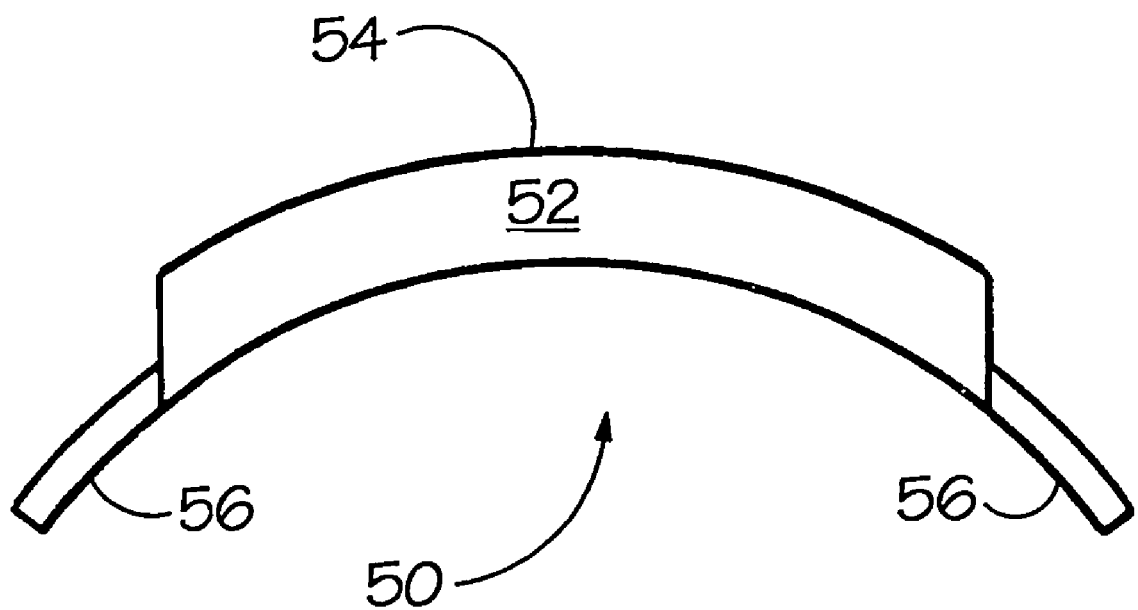
FIG. 3 is a side view of a cap used in certain embodiments of the present invention.

In certain embodiments a cap 50 of the type illustrated in FIG. 3 may be provided to cover the buckle and provide it with further protection. The cap 50 has a body 52 with an outer surface 54 curved to match and to lie flush with or below the outer surface of the ducting, and a pair of flexible wings 56 which, when the cap is forced into position over the buckle, are inserted into the annular cavities alongside the tension band 6, thereby retaining the cap in position. An alternative construction (not illustrated) users a pocket with undercut perimetral walls and a cap which is a snap fit therein.

Figure 4:
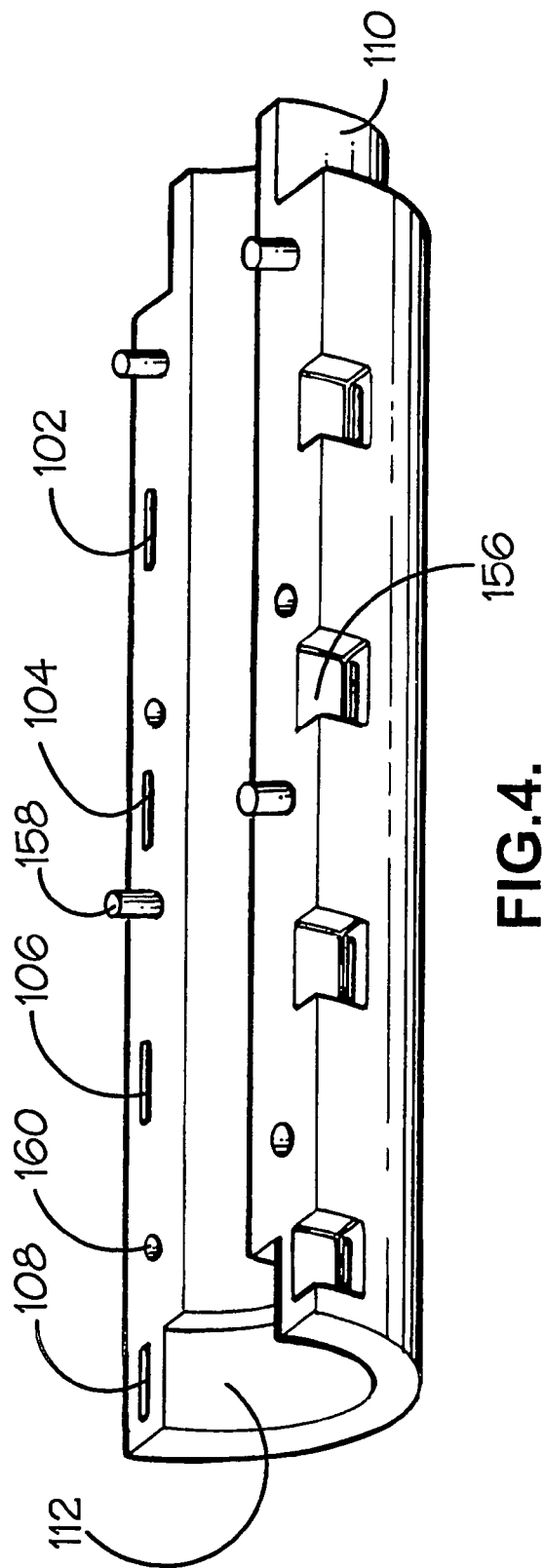
FIG. 4 is a perspective illustration of a ducting component embodying the present invention.

FIG. 4 shows a complete ducting component 100. It can be seen that the ducting component has a plurality of band-receiving cavities 102, 104, 106, 108 at regular intervals along its length. Also end regions of the ducting component are shaped to overlap and engage with end regions of longitudinally juxtaposed components. In the illustrated embodiment, this is achieved by providing a reduced diameter spigot 110 at one end of the component and a socket 112, having an increased internal diameter, at the other end of the component. The spigot is sized for receipt of the socket and in the assembled ducting projection of the spigot into the socket provides protection against damage due to ingress of foreign bodies. A tension band lies around the spigot/socket arrangement, in the cavity 108.

Figure 5:
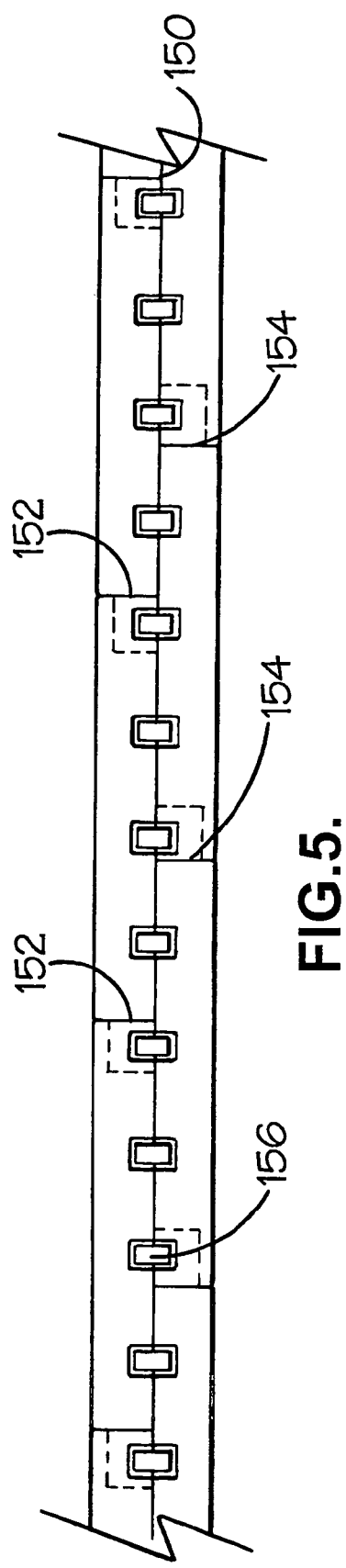
FIG. 5 is a view along a radial direction of assembled ducting embodying the present invention.

To prevent the ducting from being pulled apart longitudinally, joints between longitudinally neighbouring components may be staggered as seen in FIG. 5. Here the longitudinal join line is seen at 150 and the joints 152 between longitudinally neighbouring components on one side of line 150 are deliberately mis-aligned from joints 154 on the opposite side of the line. This staggering of ducting components is itself known.

It can be seen in FIG. 4 that part-pockets 156 are in this exemplary embodiment arranged along only one side of the ducting component. In the assembled ducting, to bring the part-pockets of the ducting components into register with each other, one component must be rotated 180° about a lateral axis (i.e. rotated end-for-end) and then longitudinally displaced, relative to its diametrally juxtaposed neighbour, to provide the requisite staggering. Alignment features comprising pips 158 and blind holes 160, are positioned (as shown) to allow the components to be assembled when so arranged.

The ducting components in the illustrated embodiments each comprise a unitary plastics moulding. The preferred material is polyurethane, whose abrasion resistance and resilience are well suited. In order to mould the annular recesses in the ducting components a semi-circular member is inserted in the mould, being mounted through its free ends. Following the moulding process the member can then be withdrawn from the moulding along a circular path.

The invention claimed is:

1. Ducting comprising a plurality of interconnectible elongate ducting components which when assembled define an elongate, longitudinally extending internal channel for receiving a pipe, cable or like elongate member, each ducting component having a shaped inner face with a longitudinal recess such that the components can be assembled with confronting inner faces, their respective longitudinal recesses being thereby aligned to form the channel, the ducting further comprising tension bands for securing assembled pairs of components to one another, wherein each ducting component is provided with a transversely extending internal cavity for receiving a tension band, the cavity having two open ends and a surrounding cavity wall extending between the two open ends so that the band can freely pass through the internal cavity of one ducting component and through a corresponding internal cavity of an adjacent ducting component in order to secure one to the other, at least part of the band being thereby contained and protected within the cavities, wherein end regions of the elongate ducting components are shaped to overlap and engage with end regions of longitudinally juxtaposed elongate ducting components.

2. Ducting as claimed in claim 1 comprising ducting components, in which an open end of the internal cavity is adjacent a pocket formed in the duct's outer surface such that a band securing arrangement used to secure the band to itself under tension can be located in the pocket.

3. Ducting as claimed in claim 2 wherein each ducting component has in its outer surface part of a pocket formed adjacent an open end of the internal cavity, so that when the components are assembled the part-pockets of adjacent components are aligned forming a pocket which lies across a join line between the two components.

4. Ducting as claimed in claim 1 wherein the all of the ducting components are of a common shape.

5. Ducting comprising a plurality of interconnectible elongate ducting components which when assembled define an elongate, longitudinally extending internal channel for receiving a pipe, cable or like elongate member, each ducting component having a shaped inner face with a longitudinal recess such that the components can be assembled with confronting inner faces, their respective longitudinal recesses being thereby aligned to form the channel, the ducting further comprising tension bands for securing assembled pairs of components to one another, wherein each ducting component is provided with a transversely extending internal cavity for receiving a tension band, the cavity having two open ends so that the band can freely pass through the internal cavity of one ducting component and through a corresponding internal cavity of an adjacent ducting component in order to secure one to the other, at least part of the band being thereby contained and protected within the cavities, wherein each ducting component has in its outer surface part of a pocket formed adjacent an open end of the internal cavity, so that when the components are assembled the part-pockets of adjacent components are aligned forming a pocket which lies across a join line between the two components, wherein the part-pockets are arranged to register one with another when adjacent components are rotated one relative to the other through 180 about a transverse axis and longitudinally displaced one relative to the other.

6. Ducting as claimed in claim 5 wherein registration features are provided on confronting portions of the inner faces to locate the components one relative to the other with their part-pockets in register.

7. Ducting as claimed in claim 1 wherein the internal cavities are substantially semi-annular.

8. Ducting as claimed in claim 1 wherein the internal cavities have one end which opens through a confronting portion of the shaped inner face, which portion confronts a corresponding portion of a neighboring ducting component in the assembled ducting, such that the tension band can pass from one of a pair of ducting components into the other of the pair without being exposed at the exterior of the ducting.

9. Ducting as claimed in claim 1 wherein at least one open end of each of the internal cavities has an enlarged mouth for receiving a free end of the tension band.

10. Ducting as claimed in claim 1 wherein at least an enc region of the tension band has a pre-formed curve to facilitate insertion into the an internal cavity.

11. An elongate ducting component having a shaped inner face in which is formed a longitudinal recess, the inner face providing confronting surfaces on either side of the recess for confronting corresponding surfaces of a further ducting component thereby to form, with the further ducting component, an elongate, longitudinally extending internal channel for the receipt of a pipe, cable or like elongate member, the ducting component having an end region which is shaped to overlap and engage with a further, longitudinally juxtaposed, ducting component, enabling formation of an elongate duct and having at least one transversely extending internal cavity for receiving a tension band, the cavity having two open ends and a surrounding cavity wall extending between the two open ends so that the band can freely pass through the internal cavity of the component to secure it to a neighboring component.

12. An elongate ducting component as claimed in claim 11, wherein an open end of the internal cavity is adjacent a pocket or part pocket formed in the duct's outer surface such that a band securing arrangement used to secure the band to itself under tension can be located in the pocket.

13. An elongate component as claimed in claim 12 wherein each ducting component has in its outer surface part of a pocket formed adjacent an open end of the internal cavity, so that when the components are assembled the part-pockets of adjacent components are aligned forming a pocket which lies across a join line between the two components.

14. An elongate component as claimed in claim 13 shaped to allow ducting to be constructed from a set of identical such components.

15. An elongate component as claimed in claim 14 wherein the part-pockets are arranged to register one with another when adjacent components are rotated one relative to the other through 180 about a transverse axis and longitudinally displaced one relative to the other.

16. An elongate ducting component having a shaped inner face in which is formed a longitudinal recess, the inner face providing confronting surfaces on either side of the recess for confronting corresponding surfaces of a further ducting component thereby to form, with the further ducting component, an elongate, longitudinally extending internal channel for the receipt of a pipe, cable or like elongate member, the ducting component having an end region which is shaped to overlap and engage with a further, longitudinally juxtaposed, ducting component, enabling formation of an elongate duct and having at least one transversely extending internal cavity for receiving a tension band, the cavity having two open ends so that the band can freely pass through the internal cavity of the component to secure it to a neighboring component, wherein the cavity is substantially semi-annular.

17. An elongate component as claimed in claim 11 wherein the internal cavities have one end which opens through a confronting portion of the shaped inner face, which portion confronts a corresponding portion of a neighboring ducting component in the assembled ducting, such that the tension band can pass from one of a pair of ducting components into the other of the pair without being exposed at the exterior of the ducting.

18. An elongate component as claimed in claim 11 wherein at least one open end of each of the internal cavities has an enlarged mouth for receiving a free end of the tension band.

19. Ducting according to claim 1, wherein the elongate ducting component has a spigot on one end region and a socket on the other end region, the spigot of one elongate ducting component adapted to engage the socket on an end region of a longitudinally juxtaposed elongate ducting component.

20. Ducting according to claim 11, wherein the elongate ducting component has either a spigot or a socket on the end region, the spigot or socket of one elongate ducting component adapted to engage the socket or spigot on an end region of a longitudinally juxtaposed elongate ducting component.

21. Ducting according to claim 1, wherein at least one tension band extends around one of the end regions to secure longitudinally juxtaposed elongate ducting components together.

22. Ducting according to claim 11, wherein at least one tension band extends around the end region to secure longitudinally juxtaposed elongate ducting components together.

* * * * *